United States Patent [19]

Drent et al.

[11] Patent Number: 5,747,638
[45] Date of Patent: May 5, 1998

[54] PROCESS FOR THE PREPARATION OF A COPOLYMER OF CARBON MONOXIDE

[75] Inventors: Eit Drent; Frits Van Der Veer; Rudolf Jacobus Wijngaarden, all of Amsterdam, Netherlands

[73] Assignee: Shell Oil Company, Houston, Tex.

[21] Appl. No.: 813,769

[22] Filed: Mar. 7, 1997

[51] Int. Cl.$^6$ .................................................. C08G 67/02
[52] U.S. Cl. ........................ 528/392; 524/701; 524/707; 524/709; 524/712; 502/102; 502/103; 502/202; 502/208
[58] Field of Search ............................ 528/392; 524/701, 524/707, 709, 712; 502/102, 103, 202, 208

[56] References Cited

U.S. PATENT DOCUMENTS

| 5,218,085 | 6/1993 | De Jong et al. | 528/392 |
| 5,420,236 | 5/1995 | Keijsper et al. | 528/392 |

FOREIGN PATENT DOCUMENTS

| 396268 | 7/1990 | European Pat. Off. . |
| 0/572087 | 1/1993 | European Pat. Off. . |
| 501576 | 2/1997 | European Pat. Off. . |
| 95/29946 | 9/1995 | WIPO . |

OTHER PUBLICATIONS

Chemical Review, vol. 96, No. 2, Mar. 1996, pp. 663–681, XP000601699 E. Drent et al.: "Palladium–Catalyzed Alternating Copolymerization of Alkenes and Carbon Monoxide".

Primary Examiner—Samuel A. Acquah

[57] ABSTRACT

A process for the copolymerization of carbon monoxide with ethene and optionally another olefinically unsaturated compound in which process the monomers are copolymerized in the presence of a liquid diluent and a catalyst composition which is based on
(a) a Group VIII metal compound,
(b) an anion of an acid which is obtainable by combining a Brønsted acid with a Lewis acid, and
(c) an organic oxidant in a quantity of less than 30 moles per mole of Group VIII metal.

10 Claims, No Drawings

PROCESS FOR THE PREPARATION OF A COPOLYMER OF CARBON MONOXIDE

FIELD OF THE INVENTION

This invention relates to a process for preparation of a copolymer of carbon monoxide with ethene and optionally another olefinically unsaturated compound.

BACKGROUND

Processes for the preparation of these copolymers by copolymerizing the monomers in the presence of a catalyst composition based on a Group VIII metal compound and a non- or weakly co-ordinating anion, such as an anion of a halomonocarboxylic acid or a sulphonic acid, in a diluent are well known in the art, for example from EP-A-213671. The copolymers prepared are linear copolymers wherein the monomer units originating from carbon monoxide and the monomer units originating from the olefinically unsaturated compound(s) occur in alternating or substantially alternating order.

From the many patent publication in this field it is apparent that in particular anions of halomonocarboxylic acids have been used as a catalyst component. Halomonocarboxylic acids, typically trifluoroacetic acid, have commonly been used as the source of anions.

EP-A-442555 teaches that to some extent the rate of copolymerization depends on the quantity of the halomonocarboxylic acid incorporated in the catalyst composition. Furthermore, it is peculiar that the quantity of the halomonocarboxylic acid at which the highest polymerization rate can be achieved depends on whether the process is carried out as a batch process or as a continuous process. When a batch process is applied, the highest rate can be achieved when about 10 moles of halomonocarboxylic acid per mole Group VIII metal is incorporated, with no further rate increase when incorporating more halomonocarboxylic acid. On the other hand, when a continuous process is applied the highest rate can be achieved at less than 6 moles of halomonocarboxylic acid per mole Group VIII metal.

EP-A-239145, EP-A-390268 and EP-A-272728 disclose that the copolymerization rate can be increased by incorporating in the catalyst composition an organic oxidant. From the working examples it would appear that the rate increase is larger when more oxidant is applied. The preferred amount of the oxidant is indicated in the range of 1–10,000 moles per mole of the Group VIII metal, in particular 10–5,000 moles per mole, for example in the order of 300–400 moles per mole of the Group VIII metal.

The processes referred to hereinbefore are liquid phase copolymerizations, i.e. processes in which a liquid forms the continuous phase in the polymerization mixture. It is known that the preparation of the said copolymers can also be carried out as a gas phase process, i.e. a process in which the continuous phase of the polymerization mixture is a gas.

EP-A-501576 discloses a catalyst composition which is based on a Group VIII metal and anion of an acid which is obtainable by combining a Brønsted acid with a Lewis acid. These catalyst compositions provide a substantially higher polymerization rate in gas phase copolymerizations than the catalyst compositions comprising an anion of a halomonocarboxylic or a sulphonic acid. Accordingly, in gas phase copolymerizations the said anions of a combined Brønsted/Lewis acid have frequently been used as a catalyst component. Tetrafluoroboric acid has shown to be a very suitable source of anions of a combined Brønsted/Lewis acid.

EP-A-572087 discloses that an oxidant can only satisfactorily be used in the gas phase process when it is applied in a quantity of less than 30 moles per mole Group VIII metal.

It has now unexpectedly been found that when the copolymerization is carried out as a liquid phase process, a very high polymerization rate can be achieved by applying anions of a combined Brønsted/Lewis acid in combination with an oxidant, the latter in a quantity of less than 30 moles per mole of Group VIII metal. Particularly good results can be achieved when the anion is applied in a relatively large quantity, for example at least 12, in particular at least 15 equivalents per mole of Group VIII metal.

SUMMARY OF THE INVENTION

Accordingly, the present invention relates to a process for the copolymerization of carbon monoxide with ethene and optionally another olefinically unsaturated compound in which process the monomers are copolymerized in the presence of a liquid diluent and a catalyst composition which is based on (a) a Group VIII metal compound,
(b) an anion of an acid which is obtainable by combining a Brønsted acid with a Lewis acid, and
(c) an organic oxidant in a quantity of less than 30 moles per mole of Group VIII metal.

DETAILED DESCRIPTION

Olefinically unsaturated compounds which may or may not be used as monomers, in addition to carbon monoxide and ethene, include compounds consisting exclusively of carbon and hydrogen and compounds which in addition comprise hetero atoms, such as unsaturated esters, ethers and amides. Unsaturated hydrocarbons are preferred. Examples of suitable olefinic monomers, other than ethene, are lower olefins, such as propene and butene-1, cyclic olefins such as cyclopentene, aromatic compounds, such as styrene and α-methylstyrene and vinyl esters, such as vinyl acetate and vinyl propionate. Most preference is given to α-olefins, such as propene or butene-1. When in this document the term "lower" is used to specify an organic compound, this term has the meaning that the organic compound contains up to 6 carbon atoms.

When a copolymer is prepared by copolymerizing carbon monoxide with a mixture of ethene and another olefinically unsaturated compound, the melting point of the copolymer will be dependent on the ratio of the olefinic monomers as present in the liquid phase. Preferably this ratio is such that a copolymer is prepared which has a melting point above 175° C., as determined by differential scanning calorimetry, in particular such that the melting point is between 190° and 250° C.

The molar ratio of on the one hand carbon monoxide and on the other hand the olefinically unsaturated compound(s) is typically selected in the range of 1:5 to 5:1. Preferably the molar ratio is in the range of 1:2 to 2:1, substantially equimolar ratios being most preferred.

Examples of suitable Group VIII metals for use in the catalyst composition are nickel and cobalt. However, the Group VIII metal is preferably a noble Group VIII metal, of which palladium is most preferred.

The Group VIII metal is typically employed as a cationic species. As the source of Group VIII metal cations conveniently a Group VIII metal salt is used. Suitable salts include salts of mineral acids such as sulphuric acid, nitric acid, phosphoric acid and sulphonic acids, and organic salts, such as acetylacetonates. Preferably, a salt of a carboxylic acid is used, for example a carboxylic acid with up to 8 carbon atoms, such as acetic acid, trifluoroacetic acid, trichloroacetic acid, propionic acid and citric acid. Palladium (II) salts, in particular palladium (II) acetate and palladium (II) trifluoroacetate represent particularly preferred sources of palladium cations. Another suitable source of Group VIII metal cations is a compound of the Group VIII metal in its zero-valent state.

The Group VIII metal containing catalyst compositions is further based on an anion of an acid which is obtainable by combining a Brønsted acid with a Lewis acid, indicated hereinafter by the term "combined Brønsted/Lewis acid". Suitable sources of such anions are salts, for example cobalt or nickel salts. A preferred source of the anions is the combined Brønsted/Lewis acid.

Examples of suitable Brønsted acids which may be combined with a Lewis acid are the above mentioned acids which may also participate in the Group VIII salts, e.g. sulphonic acids, but they are in particular selected from hydrohalogenic acids. Hydrogen fluoride is a preferred hydrohalogenic acid.

Lewis acids which can suitably be combined with a Brønsted acid are for example halides, in particular fluorides, of boron, tin, phosphorus, titanium, antimony, aluminium or arsenic. Boron trifluoride and boron pentafluoride are very suitable. Other suitable Lewis acids are hydrocarbylboranes. The hydrocarbylboranes may comprise one hydrocarbyl group or two or three of the same or different hydrocarbyl groups attached to boron, such as alkyl, aryl, aralkyl, alkaryl and cycloalkyl groups, preferably aryl groups. The hydrocarbylboranes may also comprise hydrocarbyloxy or hydroxy groups or halogen atoms attached to boron. Examples of very suitable hydrocarbylboranes are triphenylborane, tris(perfluorophenyl)borane and tris[3,5-bis(trifluoromethyl)phenyl]borane. From the above it would appear that in particular boron containing Lewis acids are suitable.

Combined Brønsted/Lewis acids which are especially suitable for use in the process of this invention are hexafluoroboric acid (from hydrogen fluoride and boron pentafluoride), hexafluorotitanic acid (from hydrogen fluoride and titanium tetrafluoride), hexafluorophosphoric acid (from hydrogen fluoride and phosphorus pentafluoride), hexafluoroantimonic acid (from hydrogen fluoride, antimony pentafluoride), and in particular tetrafluoroboric acid (from hydrogen fluoride and boron trifluoride).

The anion of a combined Brønsted/Lewis acid is typically used in a quantity of at least 4 equivalents per mole of Group VIII metal. A practicable upper limit to this quantity is 50 equivalents per mole of Group VIII metal. A preferred range is from 5 to 40, in particular from 6 to 30 equivalents per mole Group VIII metal. When the Group VIII metal is bivalent and the anion of the combined Brønsted/Lewis acid carries a single negative charge, 1 equivalent of the anion per mole of Group VIII metal corresponds with 2 moles of the anion per mole of Group VIII metal.

Catalyst compositions which are based on (a) a Group VIII metal compound,
(b) an anion of an acid which is obtainable by combining a Brønsted acid with a Lewis acid, in a quantity of at least 12 equivalents per mole of Group VIII metal, and
(c) an organic oxidant in a quantity of less than 30 moles per mole of Group VIII metal are novel.

The present invention also relates to these novel catalyst compositions.

The catalyst composition of this invention is preferably based, as an additional component, on a ligand which forms a complex with the Group VIII metal. It would appear that the presence of two complexing sites in one ligand molecule significantly contributes to the activity of the catalysts. It is thus preferred to use a ligand containing at least two dentate groups which can complex with the Group VIII metal. Although less preferred, it is also possible to employ a monodentate ligand, i.e. a compound which contains a single dentate group which can complex with the Group VIII metal, in particular a dentate group of phosphorus. Suitably a bidentate ligand is used which contains two phosphorus-, nitrogen- or sulphur containing dentate groups. It is also possible to use a mixed bidentate ligand such as 1-diphenylphosphino-3-ethylthiopropane.

A preferred group of bidentate ligands can be indicated by the general formula

In this formula $M^1$ and $M^2$ independently represent a phosphorus, nitrogen, arsenic or antimony atom. $R^1$, $R^2$, $R^3$ and $R^4$ independently represent a non-substituted or polar substituted hydrocarbyl group, in particular of up to 10 carbon atoms, and $R^5$ represents a bivalent organic bridging group containing at least 1 carbon atom in the bridge.

In the ligands of formula (I) $M^1$ and $M^2$ preferably represent phosphorus atoms. $R^1$, $R^2$, $R^3$ and $R^4$ may independently represent optionally polar substituted alkyl, aryl, alkaryl, aralkyl or cycloalkyl groups. Preferably at least one of $R^1$, $R^2$, $R^3$ and $R^4$ represents an aromatic group, in particular an aromatic group which is polar substituted.

Suitable polar groups include halogen atoms, such as fluorine and chlorine, alkoxy groups such as methoxy and ethoxy groups and alkylamino groups such as methylamino-, dimethylamino- and diethylamino groups. Alkoxy groups and alkylamino groups contain in particular up to 5 carbon atoms in each of their alkyl groups.

It is preferred that one or more, in particular each of $R^1$, $R^2$, $R^3$ and $R^4$ represents an aryl group, preferably a phenyl group, substituted at an ortho position with respect to $M^1$ or $M^2$ with an alkoxy group, especially a methoxy group.

In the ligands of formula (I), $R^5$ preferably represents a bivalent organic bridging group containing from 2 to 4 bridging atoms, at least two of which are carbon atoms. Examples of such groups $R^5$ are —CH$_2$—CH$_2$—, —CH$_2$—CH$_2$—CH$_2$—, —CH$_2$—C(CH$_3$)$_2$—CH$_2$— and —CH$_2$—CH$_2$—CH$_2$—CH$_2$—. Preferably $R^5$ is a trimethylene group.

Preferred ligands are 1,3-bis[bis(2,4-dimethoxyphenyl)phosphino]propane, 1,3-bis[bis(2,4,6-trimethoxyphenyl)phosphino]propane and, more preferred, 1,3-bis[bis(2-methoxyphenyl)phosphino]propane.

Other suitable bidentate ligands are nitrogen containing compounds of the general formula

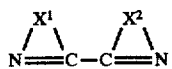

wherein $X^1$ and $X^2$ independently represent organic bridging groups each containing 3 or 4 atoms in the bridge at least 2 of which are carbon atoms. There may be an additional bridging group connecting the bridging groups $X^1$ and $X^2$. Examples of such compounds are 2,2'-bipyridine, 4,4'-dimethyl-2,2'-bipyridine, 4,4'-dimethoxy-2,2'-bipyridine, 1,10-phenanthroline, 4,7-diphenyl-1,10-phenanthroline and 4,7-dimethyl-1,10-phenanthroline. Preferred compounds are 2,2'-bipyridine and 1,10-phenanthroline.

Again other suitable bidentate ligands are sulphur containing compounds of the general formula

wherein $R^6$ and $R^7$ independently represent a non-substituted or polar substituted hydrocarbyl group and Q represents a bivalent bridging group containing 2 to 4 carbon atoms in the bridge. The groups $R^6$ and $R^7$ are preferably alkyl groups, each having in particular up to 10 carbon atoms. Very suitable bis thio compounds are 1,2-bis (ethylthio)ethane and 1,2-bis(propylthio)ethene.

The amount of bidentate ligand supplied may vary considerably, but is usually dependent on the amount of Group VIII metal present in the catalyst composition. Preferred amounts of bidentate ligands are in the range of from 0.5 to 8, more preferably in the range of from 0.5 to 2 moles per gram atom of Group VIII metal, unless the bidentate ligand is a nitrogen bidentate ligand, in which case the bidentate ligand is preferably present in an amount of from 0.5 to 200 and in particular 1 to 50 moles per gram atom of Group VIII metal. The monodentate ligands are preferably present in an amount of from 0.5 to 50 and in particular 1 to 25 moles per gram atom of Group VIII metal.

The quantity of catalyst composition used relative to the quantity of olefinically unsaturated compound(s) may vary between wide limits. Recommended quantities of catalyst composition are in the range of $10^{-8}$ to $10^{-2}$, calculated as moles of Group VIII metal per mole of olefinically unsaturated compound to be copolymerized with carbon monoxide. Preferred quantities are in the range of $10^{-7}$ to $10^{-3}$ on the same basis.

In accordance with this invention the Group VIII metal catalyst composition contains an organic oxidant in a quantity of less than 30 moles per mole of Group VIII metal. Examples of oxidants are quinones and aromatic nitro compounds. Preferred oxidants are quinones selected from the group consisting of benzoquinone, naphthoquinone and anthraquinone. The organic oxidant is typically applied in a quantity of at least 2 moles per mole Group VIII metal. The preferred quantity of oxidant is in the range of from 5 to 20 mole per mole of Group VIII metal.

The process of this invention is carried out in the presence of a liquid diluent. Preferably a liquid diluent is selected in which the copolymer to be prepared forms a suspension, which implies that a diluent is preferably selected in which the copolymer is insoluble or virtually insoluble. Examples of suitable liquid diluents are ketones (e.g. acetone), chlorinated hydrocarbons (e.g. chloroform or dichloromethane), aromatics (e.g. toluene, benzene, chlorobenzene) and, preferably, protic diluents, such as lower alcohols (e.g. methanol and ethanol). Mixtures of liquid diluents may be used as well, for example protic diluents may comprise an aprotic diluent. If desired, an excess of one or more of the olefinically unsaturated compounds may be used as a liquid diluent, for example propene.

The weight of the copolymer present in the copolymerization mixture relative to the weight of the liquid diluent, i.e. the copolymer concentration, is a factor determining the viscosity of the copolymerization mixture, and thereby e.g. its handleability. The copolymer concentration results from the rate of copolymer formation per unit reaction volume and from the residence time. Thus, when the copolymerization is carried out as a continuous process, which constitutes a preferred embodiment of this invention, the copolymer concentration may be set, for example, by selecting the catalyst feed rate or the diluent feed rate. For practical reasons, in particular when the copolymerization process is carried out in a liquid diluent in which the copolymer to be prepared forms a suspension, i.e. as a suspension copolymerization process, the conditions are preferably selected such that the copolymer concentration is lower than 20 %w, in particular in the range of from 2 to 15 %w, relative to the weight of the diluent. When the copolymerization process is carried out as a batch process, which term includes a semi-batch process, the copolymer concentrations specified are those at the end of the reaction time.

The copolymerization process is usually carried out at a temperature in the range of from 20° to 200° C., preferably at a temperature in the range of from 30° to 150° C., and usually applying a pressure in the range of from 0.2 to 20 MPa, pressures in the range of from 1 to 10 MPa being preferred.

When the copolymerization is carried out as a batch or continuous suspension copolymerization process, it is suitable to suspend a powder of a copolymer which is typically based on the same monomers as the copolymer to be prepared in the diluent before the monomers are contacted with the catalyst composition. The quantity of the copolymer suspended is preferably in the range of 0.1–20 %w, in particular 0.5–10 %w, relative to the weight of the diluent.

The copolymer may be recovered from the polymerization mixture by any suitable conventional technique.

The copolymers prepared according to this invention contain residues of the catalyst composition used in their preparation, which comprise a Group VIII metal and an anion of a combined Brønsted/Lewis acid. As indicated hereinbefore, these catalyst compositions are very suitable for use under gas phase polymerization conditions. It may therefore be advantageous to apply these copolymers as a catalyst carrier in a subsequent gas phase process for the preparation of copolymers of carbon monoxide with an olefinically unsaturated compound, in particular copolymers of carbon monoxide with ethene and optionally another olefinically unsaturated compound. When a copolymer is used as a catalyst carrier and it is deemed not to contain sufficient Group VIII metal, further Group VIII metal compound may be applied thereon. Further catalyst components other than a Group VIII metal compound may be applied onto the copolymer in order to optimise the catalyst performance in the subsequent gas phase process. Such application of catalyst components may be effected, for example by impregnation or otherwise.

The present invention also relates to this subsequent gas phase process for the copolymerization of carbon monoxide with an olefinically unsaturated compound.

For the subsequent gas phase copolymerization process the monomers, the monomer composition, the catalyst composition, the temperature, the pressure, the diluent, etc. may be selected as indicated hereinbefore or as taught in EP-A-248483 or EP-A-501576. It is noted that the quantity of liquid diluent fed to the gas phase process is in particular selected such that it is 20–80% by weight, more in particular 40–60% by weight, of the quantity which is sufficient to saturate the gas phase under the conditions of the copolymerization. The copolymers used as a catalyst carrier are preferably based on the same monomers as those which are used in the subsequent polymerization process.

The copolymers obtained according to the invention are suitable as thermoplastics for fibres, films or sheets, or for injection moulding, compression moulding and blow moulding applications. They may be used for applications in the car industry, for the manufacture of packaging materials for food and drinks and for various uses in the domestic sphere.

The invention is now illustrated by means of the following examples.

EXAMPLES 1-4

In these examples carbon monoxide/ethene copolymers were prepared by a continuous process in a 10-1 autoclave equipped with baffles and a mechanical stirrer. There was a continuous feed of methanol, used as the polymerization diluent, and of a catalyst solution containing per 1 of methanol 19 mmoles of palladium II acetate, 20.9 mmoles of 1,3-bis[bis(2-methoxyphenyl)phosphino]propane and 380–760 mmoles of tetrafluoroboric acid ($HBF_4$, applied as a 48 w-% aqueous solution) and, optionally, 47.5–475 mmoles of naphthoquinone (NQ). The feed rates were adjusted such that the palladium concentration in the polymerization mixture was 4–5 ppmw, calculated on methanol and that the residence times were as indicated in Table I. The pressure was maintained at 4.8 MPa by supplying a carbon monoxide and ethene at a 1:1 molar ratio. The temperature was maintained at 90°–95° C. The quantity of methanol in the reactor was 5 kg.

Table I shows the further reaction conditions which were different for the various examples and it shows the results.

The production rate was determined by measuring the weight of polymer in the reactor effluent, relative to the weight of the methanol (i.e. suspension concentration). The polymerization rate was determined by relating the production rate with the residence time.

TABLE I

| Example | 1 | 2 | 3 | 4 |
| --- | --- | --- | --- | --- |
| Molar ratio $HBF_4$/Pd acetate | 20 | 20 | 20 | 40 |
| Molar ratio NQ/Pd acetate | 2.5 | 10 | 25 | 10 |
| Temperature, °C. | 90 | 90 | 90 | 90 |
| Residence time, h | 1.0 | 1.0 | 1.0 | 0.5 |
| Suspension concentration, % w | 3.4 | 13.6 | 4.1 | 8.9 |
| Polymerization rate, kg/(g Pd.h) | 8 | 40 | 9 | 55 |

We claim:

1. A process for the copolymerization of carbon monoxide with ethene and optionally another olefinically unsaturated compound in which process the monomers are copolymerized in the presence of a liquid diluent and a catalyst composition which is based on
   (a) a Group VIII metal compound,
   (b) an anion of an acid which is obtainable by combining a Brønsted acid with a Lewis acid, and
   (c) an organic oxidant in a quantity of less than 30 moles per mole of Group VIII metal.

2. A process as claimed in claim 1, wherein the Bronsted acid is a hydrohalogenic acid and the Lewis acid comprises boron.

3. A process as claimed in claim 1 wherein the anion of an acid which is obtainable by combining a Bronsted acid with a Lewis acid is applied in a quantity in the range of from 5 to 40 equivalents per mole Group VIII metal.

4. A process as claimed in claim 1 wherein the organic oxidant is a quinone.

5. A process as claimed in claim 1 wherein the organic oxidant is applied in a quantity in the range of from 5 to 20 mole per mole of Group VIII metal.

6. A process as claimed in claim 1 wherein the olefinically unsaturated compound is selected from the group consisting of ethene, propene, butene-1 and mixtures thereof.

7. A process as claimed in claim 1 conducted in a protic diluent at a temperature in the range of from 30° to 150° C. and a pressure in the range of from 1 to 10 Mpa, with a molar ratio carbon monoxide to olefinically unsaturated compounds selected in the range of 1:2 to 2:1, and using a quantity of catalyst composition in the range of $10^{-7}$ to $10^{-3}$, calculated as moles of Group VIII metal per mole of olefinically unsaturated compounds to be copolymerized with carbon monoxide.

8. A process as claimed in claim 1 conducted as a continuous process.

9. A catalyst composition which is based on
   (a) a Group VIII metal compound,
   (b) an anion of an acid which is obtainable by combining a Brønsted acid with a Lewis acid, in a quantity of at least 12 equivalents per mole of Group VIII metal, and
   (c) an organic oxidant in a quantity of less than 30 moles per mole of Group VIII metal.

10. A process for the copolymerization of monomers comprising carbon monoxide with an olefinically unsaturated compound in the presence of a Group VIII metal containing catalyst composition and a catalyst carrier comprising a copolymer of carbon monoxide and one or more olefinically unsaturated compounds conducted as a gas phase process.

* * * * *